US011632399B2

(12) United States Patent
Bouvet et al.

(10) Patent No.: US 11,632,399 B2
(45) Date of Patent: Apr. 18, 2023

(54) SECURE ADMINISTRATION OF A LOCAL COMMUNICATION NETWORK COMPRISING AT LEAST ONE COMMUNICATING OBJECT

(71) Applicant: Orange, Issy-les-Moulineaux (FR)

(72) Inventors: Eric Bouvet, Chatillon (FR); Xavier Le Guillou, Chatillon (FR)

(73) Assignee: Orange

( * ) Notice: Subject to any disclaimer, the term of this patent is extended or adjusted under 35 U.S.C. 154(b) by 100 days.

(21) Appl. No.: 16/978,643

(22) PCT Filed: Mar. 5, 2019

(86) PCT No.: PCT/FR2019/050487
§ 371 (c)(1),
(2) Date: Sep. 25, 2020

(87) PCT Pub. No.: WO2019/186005
PCT Pub. Date: Oct. 3, 2019

(65) Prior Publication Data
US 2021/0029169 A1    Jan. 28, 2021

(30) Foreign Application Priority Data

Mar. 26, 2018   (FR) ...................... 1852612

(51) Int. Cl.
*H04L 9/40*        (2022.01)
*H04L 12/28*       (2006.01)
(Continued)

(52) U.S. Cl.
CPC ............ *H04L 63/20* (2013.01); *G06F 21/572* (2013.01); *H04L 12/2834* (2013.01);
(Continued)

(58) Field of Classification Search
CPC ............ G06F 21/572; G06F 2221/033; H04L 12/2834; H04L 61/2015; H04L 63/0254;
(Continued)

(56) References Cited

U.S. PATENT DOCUMENTS 7,966,659 B1 * 6/2011 Wilkinson .......... H04L 63/0209
726/25
8,019,878 B1 * 9/2011 Allen ...................... H04W 4/00
709/227

(Continued)

OTHER PUBLICATIONS

S. Acharya, J. Wang, Z. Ge, T. F. Znati and A. Greenberg, "Traffic-Aware Firewall Optimization Strategies," 2006 IEEE International Conference on Communications, 2006, pp. 2225-2230, doi: 10.1109/ICC.2006.255101. (Year: 2006).*

(Continued)

*Primary Examiner* — Michael Simitoski
(74) *Attorney, Agent, or Firm* — Knobbe, Martens, Olson & Bear, LLP (57) ABSTRACT

A method of managing a local area communication network comprising at least one access equipment for accessing the network is disclosed. At least one communicating object is connected to the network. In one aspect, the method comprises upon detecting connection of a new communicating object to the network and/or upon detecting installation of new firmware on the at least one communicating object connected to the network, a learning phase involving observing interactions of the communicating object with at least one other equipment of the local area network and/or at least one equipment of a wide area communication network accessible via the access equipment. In addition, at least one security rule associated with the communicating object on the basis of the observed interactions is disclosed.

18 Claims, 3 Drawing Sheets

(51) Int. Cl.
   *H04L 61/5014* (2022.01)
   *G06F 21/57* (2013.01)
(52) U.S. Cl.
   CPC ...... *H04L 63/0254* (2013.01); *H04L 63/0263* (2013.01); *H04L 63/1425* (2013.01); *G06F 2221/033* (2013.01); *H04L 61/5014* (2022.05)
(58) Field of Classification Search
   CPC . H04L 63/0263; H04L 63/10; H04L 63/1425; H04L 63/145; H04W 12/088; H04W 12/128
   See application file for complete search history.

(56) References Cited

U.S. PATENT DOCUMENTS

| | | | | |
|---|---|---|---|---|
| 8,695,081 | B2* | 4/2014 | Bansal | H04W 12/088 726/13 |
| 10,091,312 | B1* | 10/2018 | Khanwalkar | H04L 67/306 |
| 10,270,754 | B2* | 4/2019 | Sato | H04L 63/0815 |
| 2008/0016339 | A1* | 1/2008 | Shukla | G06F 21/54 713/164 |
| 2008/0109679 | A1* | 5/2008 | Wright | H04L 63/20 714/37 |
| 2009/0103524 | A1* | 4/2009 | Mantripragada | H04L 65/1079 370/352 |
| 2011/0067091 | A1* | 3/2011 | Chavez | H04L 63/0823 726/5 |
| 2013/0326047 | A1* | 12/2013 | Easty | H04L 43/0876 709/224 |
| 2014/0007222 | A1* | 1/2014 | Qureshi | G06F 21/14 726/16 |
| 2015/0269383 | A1* | 9/2015 | Lang | H04L 63/20 726/1 |
| 2015/0381427 | A1* | 12/2015 | Roskind | H04L 41/0896 709/221 |
| 2016/0088021 | A1 | 3/2016 | Jayanti Venkata et al. | |
| 2016/0112240 | A1* | 4/2016 | Sundaresan | H04L 67/16 726/1 |
| 2016/0112374 | A1 | 4/2016 | Branca | |
| 2016/0212099 | A1* | 7/2016 | Zou | H04L 63/0263 |
| 2016/0301707 | A1* | 10/2016 | Cheng | H04L 67/12 |
| 2016/0323318 | A1* | 11/2016 | Terrill | H04L 63/0227 |
| 2016/0352774 | A1* | 12/2016 | Akcin | H04L 63/0236 |
| 2017/0061322 | A1* | 3/2017 | Chari | G06F 21/55 |
| 2017/0076202 | A1* | 3/2017 | George | G06N 5/045 |
| 2017/0111432 | A1* | 4/2017 | Saini | G06F 11/3409 |
| 2017/0118240 | A1 | 4/2017 | Devi Reddy et al. | |
| 2017/0366462 | A1* | 12/2017 | Soelberg | H04L 43/0882 |
| 2018/0054418 | A1* | 2/2018 | El Defrawy | H04L 63/10 |
| 2018/0278648 | A1* | 9/2018 | Li | H04L 63/1416 |
| 2018/0302440 | A1* | 10/2018 | Hu | H04L 63/1441 |
| 2018/0316555 | A1* | 11/2018 | Salgueiro | H04L 41/0816 |
| 2018/0337958 | A1* | 11/2018 | Nagarkar | H04L 63/0227 |
| 2019/0116193 | A1* | 4/2019 | Wang | H04L 63/205 |
| 2019/0222594 | A1* | 7/2019 | Davis, III | H04L 63/1416 |

OTHER PUBLICATIONS

Belden. "3 Ways Firewall Learning Mode Simplifies ICS Security", Aug. 2015. Retrieved from <https://www.belden.com/blogs/three-ways-firewall-learning-mode-simplifies-ics-security>. (Year: 2015).*

K. Golnabi, R. K. Min, L. Khan and E. Al-Shaer, "Analysis of Firewall Policy Rules Using Data Mining Techniques," 2006 IEEE/IFIP Network Operations and Management Symposium NOMS 2006, 2006, pp. 305-315, doi: 10.1109/NOMS.2006.1687561. (Year: 2006).*

Sørensen, D. A., N. Vanggaard, and J. M. Pedersen. "IoTsec: Automatic profile-based firewall for IoT devices." (2017). (Year: 2017).*

International Search Report dated May 20, 2019, issued in Patent Cooperation Treaty Application No. PCT/FR2019/050487.

* cited by examiner

SECURE ADMINISTRATION OF A LOCAL COMMUNICATION NETWORK COMPRISING AT LEAST ONE COMMUNICATING OBJECT

RELATED APPLICATIONS

This application is filed under 35 U.S.C. § 371 as the U.S. National Phase of Application No. PCT/FR2019/050487 entitled "SECURE ADMINISTRATION OF A LOCAL COMMUNICATION NETWORK COMPRISING AT LEAST ONE COMMUNICATING OBJECT" and filed Mar. 5, 2019, and which claims priority to FR 1852012 filed in France on Mar. 26, 2018, each of which is incorporated by reference in its entirety.

1. FIELD OF THE INVENTION

The field of the invention is that of local area communication networks, in particular but not exclusively home communication networks, comprising an access equipment or gateway and a plurality of communicating objects, such as computers, tablets and smartphones, but also webcam cameras, weather stations, sensors, thermostats, etc.

More precisely, the invention relates to the management of a security policy within such a local area communication network.

2. PRIOR ART AND ITS DRAWBACKS

At present, when a communicating object is connected in a communication network, and wishes to exchange data on this network, it is necessary for it to obtain certain configuration parameters, and in particular an IP ("Internet Protocol") address. The automatic configuration protocol most commonly used for this purpose is the DHCP ("Dynamic Host Configuration Protocol") protocol.

Conventionally, the communicating object broadcasts a DHCP DISCOVER datagram on the network. Upon reception, a DHCP server, which is present for example in the network access gateway, sends a DHCP OFFER offer in response to the communicating object, if it is able to offer an address on the network to which the communicating object belongs. Such a DHCP offer contains the IP address of the server, as well as the IP address and the subnet mask that it offers to the communicating object.

If it accepts this offer, the communicating object broadcasts a DHCP request datagram (DHCP REQUEST) on the network, which contains the IP address of the server and the one that has just been offered thereto. In particular, this has the effect of asking the DHCP server to assign this address, and possibly to send the values of certain parameters.

The DHCP server formulates an acknowledgement of receipt datagram (DHCP ACK for acknowledgement), which assigns the communicating object the IP address and its subnet mask, the duration of the lease of this address, and possibly other parameters, including the IP address of the default gateway, and the IP addresses of the DNS servers.

The DHCP server, which is more often than not integrated into the access gateway to the local area network (the home gateway in the case of a home network), thus allocates configuration parameters, of the same kind and of the same scope, to all of the communicating objects of the network that request them, allowing them firstly to access the resources and data of the local area network, and secondly to access the World Wide Web.

Although this posed few problems when local area networks were originally conceived, when only one or two PC-type personal computers were present on the network, the increase in the number of communicating objects, of all types and from all sources, poses security problems with regard to this approach.

Specifically, there is an increased risk of one of these communicating objects having one or more security flaws, likely to allow a malicious individual to penetrate the local area network, for example by installing malicious software ("malware") on the communicating object in order to carry out malicious activities thereon, such as the theft of data or a denial of service attack for example.

The addition by a user of a communicating object to a local area communication network, whether it is connected in wired mode via an Ethernet cable or wirelessly to a Wi-Fi network in WPA2 (for "Wi-Fi Protected Access 2") mode, generally guarantees that this communicating object has been intentionally connected by the administrator of the network.

However, this administrator or user may not be aware of the existence of security flaws on this communicating object, all the more so since these security flaws are associated with a given version of software embedded in the communicating object. Thus, an object that is a priori reliable may cease to be so, following an update of its "firmware", without the user realizing this.

To solve this problem, it has been contemplated to classify the communicating objects of a local area communication network into trust categories (that is to say the category of secure objects, the category of insecure objects, etc.), and to statically allocate access rules common to all of the communicating objects in one and the same trust category, within the network. This thus gives a protection mechanism that makes it possible to statically isolate a group of equipments or communicating objects.

However, it proves to be complex in practice to define security or access rules that are able to be common to all of the communicating objects in one and the same trust, category, these access or security rules in practice being closely linked to the specifics and functions of a particular communicating object. A webcam and a weather station may thus belong to one and the same trust category, but have very different needs in terms of activity and connection: for example, the webcam may, during normal operation, send video streams corresponding to the monitoring of a home to an address external to the local area communication network, whereas such a practice corresponds a priori to deviant operation for a weather station.

There is therefore a need for a technique for the secure management of a local area communication network that does not have these various drawbacks from the prior art. There is in particular a need for such a technique that makes it possible to take better account of the specific communication needs of each communicating object.

3. DISCLOSURE OF THE INVENTION

The invention addresses this need by proposing a method for managing a local area communication network comprising at least one access equipment for accessing said network, and at least one communicating object able to be connected to said network. Such a management method comprises:

upon detecting connection of a new communicating object to said network and/or upon detecting installation of new firmware on said at least one communicating object connected to said network, a learning phase involving observing interactions of said communicating object with at least one other equipment of said local area network and/or at least one equipment of a wide area communication network accessible via said access equipment;

creating at least one security rule associated with said communicating object on the basis of said observed interactions.

The invention is thus based on a completely novel and inventive approach to the management of the security rules that apply to the equipments of a local area communication network, such as a home network for example.

Specifically, the invention proposes to define security rules specific to each communicating object, on the basis of the communication needs of the object under consideration.

In a first learning phase, which is initialized upon detection of the connection of a new communicating object in the network, or upon detection of updating of the firmware of a communicating object already present in the network, the connections necessary for operation qualified as "normal" from the connected object to its network ecosystem, comprising the other equipments of the local area communication network, are observed, but also the remote equipments of the wide area communication network that the communicating object is able to access via the access equipment or the home gateway. Specifically, it is assumed that, when it initially connects to the local area communication network, the communicating object has a behavior that may be qualified as "normal" or "healthy", and is therefore not a priori configured so as to perform malicious activities.

In this learning phase, all of the interactions of the communicating object with other equipments in terms of the type, volume and frequency of incoming and outgoing data, and addresses of the contacted equipments, are therefore observed. The observation data are for example recorded in a database, and then analyzed by inductive logic programming, or fuzzy logic, or any other machine learning method, in order to deduce therefrom a set of precepts characteristic of "normal" operation of the communicating object.

On the basis of these precepts, a set of one or more security rules specific to the communicating object whose operation has been observed is then created. These security rules are a priori applicable only to, this communicating object.

According to a first aspect, the security rule(s) associated with said communicating object comprise a list of at least one equipment of said local area communication network and/or of said wide area communication network that said communicating object is authorized to access.

It is thus possible to establish a whitelist of the addresses that the communicating object is authorized to contact within the framework of normal activity. All other access operations that it might attempt to perform are considered to belong to a blacklist, which may or may not be defined.

According to another aspect, the security rule(s) associated with said communicating object comprise a maximum volume of data that the communicating object is authorized to exchange.

Specifically, a communicating object of the temperature sensor type, for example, is intended only to exchange small amounts of data, for example in the form of data packets containing the measured and possibly timestamped temperature. It is therefore possible to define a maximum size of the data packets that the sensor should normally transmit, expressed in bytes or in kilobytes, or a maximum authorized volume of data, corresponding to all of the data packets that it should normally send, over a defined time range, for example per hour.

The sending by this sensor of a volume of data greater than this maximum volume authorized by the established security rule is indicative of deviant behavior, or of malicious activity.

According to another aspect, the security rule(s) associated with said communicating object comprise a maximum number of access requests that said communicating object is authorized to transmit. Mass sending of requests by a communicating object may specifically be indicative of deviant behavior, such as participation in a botnet (contraction of "robot" and "network") attack.

According to another aspect, the learning phase has a duration able to be parameterized by a manager of the local area communication network. This duration may take the form of a temporal duration (number of hours, number of days), or of a number of requests that will be transmitted by the communicating object. It may be parameterized by the manager of the local area network (for example the administrator user of this network, or a manager of the access provider of this local area network) depending on the type of communicating object, on the learning algorithm used to create the security rules, etc.

According to yet another aspect, such a management method comprises transmitting data relating to the interactions observed for the communicating object to at least one equipment of the wide area communication network. It is thus possible to pool the learning phase, for example on the network of the operator, for several communicating objects of the same kind that are connected to several separate local, area communication networks. To this end, the access equipment of a first local area communication network may transmit data relating to the interactions observed for a given communicating object to a collection server of the wide area communication network. Said collection server may centralize the data collected in a plurality of local area communication networks, for this type of communicating object, in order to enrich, and possibly shorten, the learning phase that will be initiated for this type of communicating object in another local area communication network.

According to a corollary aspect, the creation of the security rule(s) also takes into account data relating to interactions observed for a communicating object of the same type as said communicating object, in at least one other local area communication network.

This information is for example received by the access equipment or the home gateway, from a collection server, managed by the operator of the wide area communication network. Said information makes it possible to enrich the learning, and possibly to reduce the duration thereof.

According to one aspect of the invention, in the event of detecting an interaction of said communicating object with at least one other equipment of said local area network and/or at least one equipment of a wide area communication network accessible via said access equipment that contravenes said created security rule, it comprises a step of blocking said interaction.

Thus, as soon as deviant behavior of the communicating object that does not correspond to the interactions observed in "normal" operation thereof is observed, it may be isolated, within the local area communication network. This blocking may consist for example in preventing access to a UPnP-IGD ("Universal Plug, and Play-Internet gateway Device") configuration service, or in preventing routing to another equipment of the local area communication network, depending on the created security rule.

According to another aspect, such a method also comprises storing the blocked interaction in a log of suspicious interactions and/or alerting a user of said communicating object.

This log of suspicious interactions may advantageously be consulted by the user or the administrator of the local area communication network. It is also possible for the detection of deviant behavior of a communicating object to automatically trigger the transmission of an alert to the user or the administrator of the local area communication network, for example by sending a message thereto. Such an alert may also be triggered when a certain number of suspicious interactions have been stored in the log.

According to another aspect, such a method comprises modifying said created security rule if a user of said communicating object is present within said local area communication network. It is thus possible for example to relax the security rules when it is detected that the user is physically present in the local area communication network, and therefore able to monitor the behavior of his communicating objects. This thus avoids problems associated with overly strict security, which may have a negative impact on the use of the services of the local area communication network. According to the techniques from the prior art, the security rules associated with a communicating object are static, without there being any provision to adapt them, for example to bolster them, if the user is absent from his home. It may therefore be advantageous to provide strict security rules, which apply by default when the user is not at home, but to be able to relax and ease them when the presence of an authorized user is detected close to the communicating object, or in the ecosystem of the local area communication network.

The invention also relates to a computer program product composing program code instructions for implementing a method for managing a local area communication network as described above when it is executed by a processor.

The invention also targets a computer-readable recording medium on which there is recorded a computer program comprising program code instructions for executing the steps of the method for managing a local area communication network according to the invention as described above.

Such a recording medium may be any entity or device capable of storing the program. For example, the medium may compose a storage means, such as a ROM, for example a CD-ROM or a microelectronic circuit ROM, or else a magnetic recording means, for example a USB key or a hard disk.

On the other hand, such a recording medium may be a transmissible medium such as an electrical or optical signal, which may be routed via an electrical or optical cable, by radio or by other means, such that the computer program that it contains is able to be executed remotely. The program according to the invention may in particular be downloaded from a network, for example the Internet.

As an alternative, the recording medium may be an integrated circuit in which the program is incorporated, the circuit being designed to execute or to be used in the execution of the abovementioned display control method.

The invention also relates to an access equipment for accessing a local area communication network, having, in combination, all or some of the features set forth in the whole of this document. Such an access equipment comprises:

a detection module for detecting connection of a new communicating object to the network and/or for installing new firmware on a communicating object connected to the network;

a learning module able to observe interactions of this communicating object with at least one other equipment of the local area network and/or at least one equipment of a wide area communication network accessible via the access equipment;

a creation module for creating at least one security rule associated with this communicating object on the basis of the observed interactions.

More generally, such an access equipment is able to implement a method for managing a local area communication network as described above.

According to one additional aspect, such an access equipment is integrated into a home gateway.

The abovementioned corresponding access equipment and computer program have at least the same advantages as those conferred by the method for managing a local area communication network according to the present invention.

4. LIST OF THE FIGURES

Other aims, features and advantages of the invention will become more clearly apparent upon reading the following description, given by way of simple illustrative non-limiting example with reference to the figures, in which.

5. DETAILED DESCRIPTION OF EMBODIMENTS OF THE INVENTION

The general principle of the invention is based on establishing security rules specific to each communicating object of a local area communication network, on the basis of its communication needs as observed in a learning phase. In this learning phase, no restrictive security measure is applied to the communicating object, which is considered to have, at the outset, behavior that may be qualified as healthy, or normal, that is to say non-deviant. This learning phase is based for example on a "machine learning" mechanism, and makes it possible to deduce a certain number of security rules to be associated with the communicating object. It may implement inductive logic programming (ILP), fuzzy logic, etc.

In the remainder of this document, a more detailed description is given of the implementation of one embodiment of the invention in the context of a home network, in the home of an individual user. The invention of course also applies to any other type of local area communication network (LAN, for "Local Area Network"), to which a plurality of communication equipments are connected.

Figure 1:
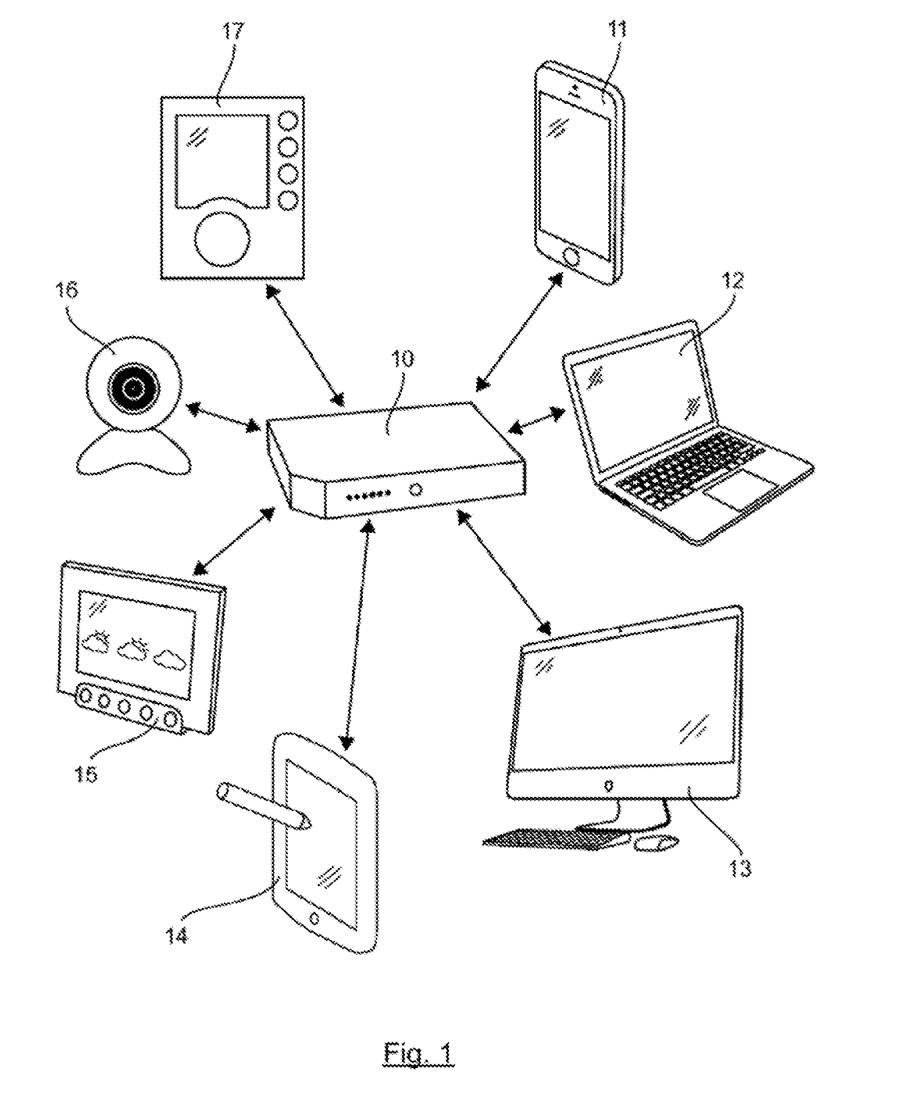
FIG. 1 shows a schematic view of a local area communication network and of the various communicating objects that are connected thereto, according to one embodiment of the invention.

In such a home network, shown schematically in FIG. 1, a home gateway HGW referenced 10 makes it possible to connect a local area communication network and a wide area network such as the Internet (not shown). Such a home gateway HGW 10 integrates a DHCP server: it routes data packets on the network, and may also perform the role of a firewall, a proxy, a DNS (for "Domain Name Server") relay, an IGD (for "Internet Gateway Device") service, provider, etc.

It also integrates a database, used in the learning phase, from which the security rules specific to each communicating object are able to be formulated.

In the example of FIG. 1, a large number of equipments are present on the local area network, namely:
- a smartphone 11;
- a laptop computer 12;
- a PC computer 13;
- a tablet 14;
- a weather station 15;
- a webcam 16;
- a thermostat 17.

This list is of course not exhaustive, and many other communicating objects may be present on the user's local area network.

These communicating objects may be connected to the network in a wired manner (Ethernet cable, USB (for "Universal Serial Bus") port, etc.) or wirelessly (Wi-Fi®, Bluetooth®, ZigBee, Z-Wave®, etc.). They comprise all types of physical objects that are able to communicate digitally on the local area network in order to exchange data. They also comprise software applications associated with certain non-IP ("Internet Protocol") connected objects, operating on wireless technologies such as BLE (for "Bluetooth® Low Energy"), Z-wave®, Thread®, etc.

Specifically, using such communicating objects more often than not requires installing a management application on an access gateway to the local area communication network. Such an application is based on a virtual machine, or a container, to which the access parameter configuration server (DHCP server) provides an IP address. Such communicating objects that are not naturally compatible with the IP protocol require the implementation of an IoT to IP gateway and/or of the "6LowPan" protocol.

Thus, hereinafter, the term communicating object denotes both physical objects connected to the network and "virtualized" software applications associated with some of these objects.

Such communicating objects may be denoted by the acronym IoT, for "Internet of Things".

From among the communicating objects in FIG. 1, it is possible to imagine that the smartphone 11 and the tablet 14 have been provided to the user by an Internet Service Provider (ISP), which has also provided the user with the network termination equipment formed by the home gateway HGW 10. Therefore, the access provider knows these equipments 11, 14, and is possibly able to provide the administrator of the local area communication network with predefined security rules for these communicating objects, which could be supplemented and/or refined in the learning phase that follows their first connection to the network, or the updating of their "firmware". By contrast, other communicating objects such as the webcam 16 or the weather station 15 may originate from other sources and other origins: the access provider may nevertheless have data resulting from the interactions observed for these communicating objects in other local area networks, which said provider would have collected, and which may also be used to establish security rules for these objects in the network of FIG. 1.

In any case, it is important to be able to establish specific security rules applicable to each of these various communicating objects referenced 11 to 17, in order in particular to adapt the rights allocated to these various objects by the DHCP server embedded in the home gateway HGW 10, or to adapt the additional mechanisms for limiting network access for these objects, such as the firewall, and to do so in order to improve the security of the local area network against possible malicious attacks.

Figure 2:
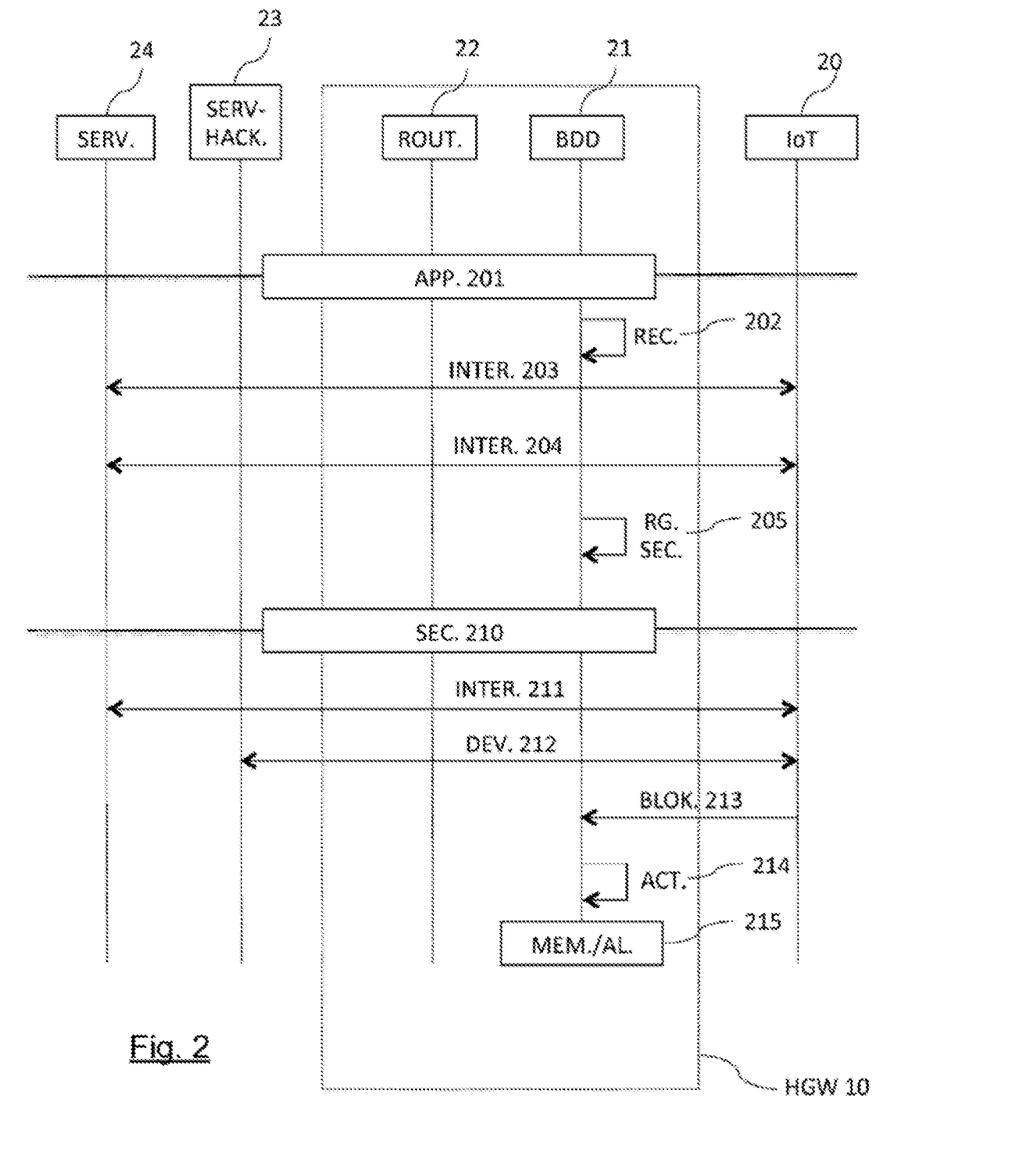
FIG. 2 shows the various steps of the management method according to one embodiment of the invention in the form of a flowchart.

To this end, one embodiment of the invention is based on the flowchart of FIG. 2.

An IoT communicating object 20 (for example the webcam 16 in FIG. 1), present on the home network, has just been installed in the ecosystem of the local area network by its manager. It initially does not have an IP address, and therefore sends, in broadcast mode, a DHCP DISCOVER datagram that is addressed to the DHCP servers present on the local area network. This datagram contains in particular the physical address (MAC for Media Access Control) of the IoT 20.

In the example of the network in FIG. 1, a single DHCP server referenced 22 is present on the local area network, for example integrated into the home gateway HGW 10. It thus detects the connection of this new IoT communicating object 21 within the local area communication network (since it sees a new MAC address that it does not know), and then triggers a learning phase APP. 201, during which the interactions of the IoT communicating object 21 with its network ecosystem will be observed, without any specific security constraints being applied.

The presence of a new IoT communicating object 21 within the local area communication network may also be detected by a dedicated service that monitors ARP (for "Address Resolution Protocol") traffic and detects a new MAC address that is not contained in the ARP tables of the router.

These interactions of the IoT 20 with its environment in "normal" (that is to say healthy or non-malicious) operating mode are symbolized in FIG. 2 by the arrows referenced INTER. 203 and INTER. 204. For the sake of simplicity, a single equipment SERV. 24 with which the IoT 20 interacts has been shown: however, this equipment SERV. 24 may symbolize one or more equipments of the local area communication network (for example the weather station 15, the tablet 14 or the smartphone 11) and one or more servers or remote equipments of the wide area communication network, for example one or more Internet services.

All of these interactions of the IoT 20 with its network environment are stored (REC. 202) by the home gateway HGW 10 within a database BDD 21, integrated into the gateway. The data stored in this way comprise the number of transmissions and receptions by the IoT 20, the size and the frequency of the associated packets, the level 3 and 4 protocols of the OSI (for "Open Systems Interconnection") model that are used, the communication ports that are used, the addresses of the equipments that are contacted, the servers that are accessed, etc.

The collection duration of this information may be parameterized, by the manager/administrator of the home network for example, depending on the type of communicating object under consideration, on the learning mechanism (PLI, fuzzy logic, etc.) that is used, on a security requirement level, etc. This parameterization may take the form of a time duration of the learning phase APP. 201, expressed in hours or in days, or on a number of requests, or on a volume of data exchanged by the communicating object with the other equipments in its close or remote surroundings.

At the end of deep learning performed on the basis of all of these data collected for IoT 20, it is possible to obtain a behavior profile, or a digital signature, specific to an IoT communicating object or to software or firmware that it embeds.

In this learning phase APP. 201, it is also possible for example to compare this communicating object and/or firmware signature, in the cloud, with other similar signatures that are obtained in other home networks for a communicating object of the same type (for example, same webcam reference from the same manufacturer). This comparison may be performed by a dedicated server of the network of the operator, after sending of this signature, representative of all of the observation data collected for the IoT 20, by the home gateway HGW 10.

From this signature, it is possible to deduce a set of security rules for the IoT 20, which are created and stored in the database BDD 21 (step RG. SEC. 205). This list of security rules is specific to the IoT 20, and applicable only to this communicating object. It may be refined, depending on a result of the comparison of the various signatures collected for the IoT 20 by the operator or the access provider.

This list of security rules makes it possible to exercise various network access control operations on the IoT communicating object 20 by:

limiting routing to other equipments of the local network in FIG. 1;

limiting access to the Internet, with a DNS (for "Domain Name System") relay limited to a whitelist of domain names;

limiting access to the Internet, with filtering of the TCP/UDP (for "Transmission Control Protocol"/"User Datagram Protocol") ports able to be used;

preventing access to configuration services, for example UPnP-IGD.

Such a security rule may for example take the form of restricting access for the IoT 20 to another equipment of the local area network, for example the laptop computer 12, on a given TCP port, with a known spec fic protocol type, and packets limited in terms of number and in terms of size.

Taking up the example of the webcam 16 for the IoT communicating object 20, it is possible for example to observe, during the learning phase APP. 201, that "normal" behavior of the webcam 16 comprises:

obtaining an IP address from the DHCP server ROUT. 22;

requesting the time, through an NTP (for "Network Time Protocol") request on a timestamp server 24 of the wide area communication network;

sending video streams to an IP (for "Internet Protocol") address specified by the manager/user of the home network, when said manager/user is absent from his home, and when the webcam 16 is used for home surveillance.

The security rules RG. SEC. 205 created at the end of the learning phase APP. 201 may then comprise creating a whitelist of authorized domain names/addresses, contacted by the webcam 16 during normal operation thereof (specifically, that of the timestamp server 24, and the IP address specified by the user), and configuring a maximum volume and frequency for sending video packets, corresponding to what was observed during the learning phase for sending video surveillance streams. All other addresses or domain names are "blacklisted", that is to say registered on a blacklist of prohibited addresses or access operations.

It is understood that these security rules are specific and applicable only to the IoT 20, in this case the webcam 16: specifically, the communication needs of the smartphone 11 or of the weather station 15 are obviously very different from those of the webcam 16, both in terms of volume of data exchanged and of servers and addresses to be accessed.

At the end of this learning phase APP. 201, the IoT communicating object 20 enters an operating phase in security mode SEC. 210, governed by security rules RG. SEC. 205 stored in the database BDD 21.

In this operating phase SEC. 210, the IoT communicating object 20 interacts with the server SERV. 24 of the wide area communication network, in accordance with the security rules recorded in the database BDD 21: these interactions, illustrated by double-headed arrow INTER. 211 in FIG. 2, correspond to what are called "normal" interactions, that is to say ones authorized by the home gateway HGW 10.

On the other hand, the IoT communicating object 20 may also attempt to access a server or an equipment that is not normally used (that is to say during "normal" operation), for example the server SERV. HACK. 23 in FIG. 2. This access attempt, corresponding to potentially deviant behavior of the IoT communicating object 20, is symbolized by the double-headed arrow DEV. 212. The address of this server SERV. HACK. 23 is therefore not contained in the whitelist stored in the security rules associated with the IoT 20 in the database BDD 21.

In this case, this unusual interaction is immediately blocked by the home gateway HGW 10, as illustrated by the arrow BLOK. 213. The IoT communicating object 20 may then be isolated, in order to prevent use thereof in the context of malicious activities liable to jeopardize the security of the home network. This blocking BLOK. 213 may be accompanied by an action ACT. 214 linked to the detected security problem, which may for example take the form of transmitting an alert to the user, or of storing the deviant behavior in a log of suspicious activities (MEM./AL. 215).

Taking up the abovementioned example of the webcam 16, such deviant behavior DEV. 212 may consist in sending the video surveillance stream from the user's home to an address other than that specified by said user, for example an address abroad. The home gateway HGW 10 may then send an alert message to the user (ACT. 214) and block the video stream transmitted by webcam 16 (BLOK. 213).

The home gateway HGW 10 may also detect that the webcam 16 is sending DNS queries en masse to a server SERV. HACK. 23, and suspect that it is participating in a Botnet (concatenation of "robot" and "network") attack. In this case, it may disconnect the stream transmitted by the webcam 16 (BLOK. 213), but also isolate the webcam 16 in quarantine (ACT. 214), for example until possible updating of its "firmware" in order to correct the security flaw affecting this communicating object.

Finally, this deviant behavior DEV. 212 may also be internal to the local area communication network. The webcam 16 may for example attack another communicating object of the home network of FIG. 1, for example by inadvertently encrypting the hard disks of the personal computer 13. Once again, it is then possible to block the webcam 16 from accessing the local equipment under attack, and to quarantine this deviant communicating object, until the security flaw affecting it is corrected, or action is taken by the administrator of the home network (for example replacing the webcam 16 with another equipment deemed to be more secure and providing the same function).

Moreover, in one embodiment of the invention, it is also possible to unlock the security upon detecting the presence of an authorized user (for example the administrator of the home network, or a user whose identifier is duly registered by the home gateway HGW 10) in the home network.

Such presence detection may be based on detecting the subscriber's smartphone on the local area communication network. It may also be based for example on detecting movement at home, by way of Z-Wave sensors (a radio protocol designed for home automation), for example.

Thus, when the home gateway HGW 10 detects that the user is present close to a communicating object of the network in FIG. 1, or more generally at home, corresponding to the environment of the home network, it may decide to ease the security rules associated with IoT communicating objects 20, in order to facilitate access for the user to the services of the home network. It is specifically assumed that, when the user is present, he is himself able to monitor the behavior of the communicating objects in order to detect possible deviance, or intentionally cause an unusual interaction for an IoT communicating object 20 with its network environment, without this unusual interaction otherwise constituting a true malicious action or a security flaw.

This relaxation of the security rules may consist in raising an authorized ceiling for the volume of data exchanged by the IoT 20, in tolerating access to a server whose address is not contained in the whitelist of authorized access operations, etc.

On the other hand, when it is detected that an authorized user is present in the local area communication network, it is also possible to bolster certain security rules, such as for example in order to prevent remote interactions, such as the transmission of video streams on the wide area communication network by local cameras of the home network. Specifically, when the user is at home, it is a priori not necessary to transmit the video surveillance stream from the home to a remote address.

Figure 3:
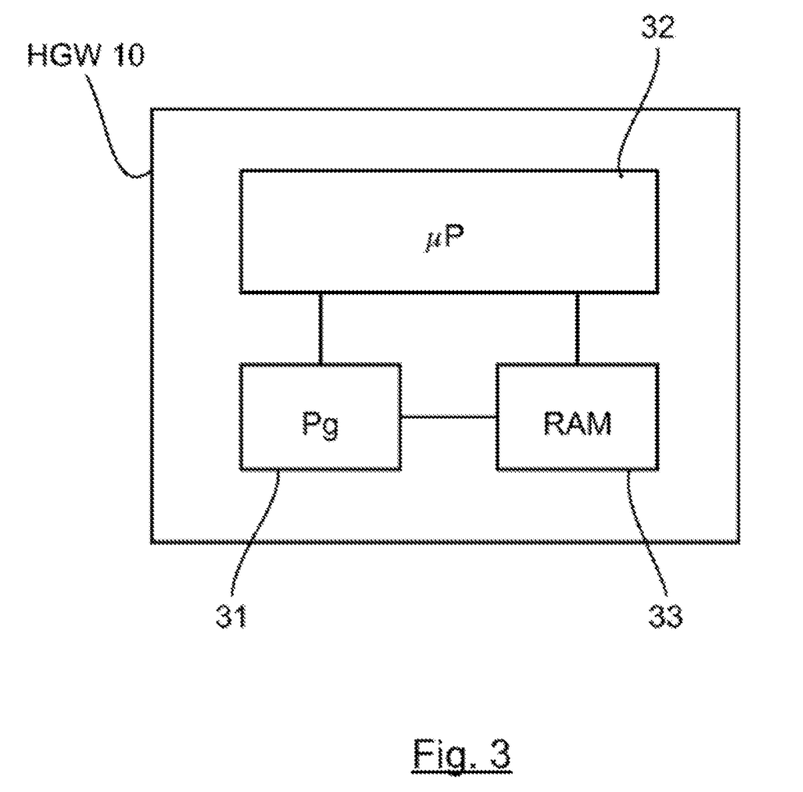
FIG. 3 provides an overview of an access equipment or of a home gateway implementing the method of FIG. 2.

With reference to FIG. 3, the hardware structure of an access equipment according to one embodiment of the invention is now shown, in which this access equipment, integrating a learning module and a creation module for creating security rules associated with communicating objects, is integrated into a home gateway HGW 10.

The term "module" may correspond equally to a software component or to a hardware component or to a set of software and hardware components, a software component itself corresponding to one or more computer programs or subroutines or, more generally, to any element of a program able to implement a function or a set of functions.

More generally, such a home gateway HGW 10 comprises a random access memory 33 (for example a RAM memory), a processing unit 32 equipped for example with a processor, and controlled by a computer program, representative of the detection module for detecting a new or updated communicating object, of the learning module and of the security rule creation module, stored in a read only memory 31 (for example a ROM memory or a hard disk). On initialization, the code instructions of the computer program are for example loaded into the random access memory 33, before being executed by the processor of the processing unit 32. The random access memory 33 contains in particular the data collected when observing the interactions of the communicating objects with their network environment as described above with reference to FIG. 2, as well as, for each communicating object, all of the security rules that are generated by the creation module and that are associated with the communicating object at the end of a learning phase. The processor of the processing unit 32 controls the recording of the data relating to the interactions of the communicating objects with their network environment in the random access memory 33, the compilation of these data by the learning module, and the resultant creation of security rules by the creation module, in accordance with the flowchart of FIG. 2. In the secure operating mode, the processor of the processing unit 32 also controls the detection of unusual interactions, the blocking thereof, and the triggering of actions linked to the detected security problem, in accordance with the flowchart of FIG. 2.

FIG. 3 illustrates only one particular way, from among several possible ones, of forming the home gateway HGW, such that it performs the steps of the method described above with reference to FIG. 2. Specifically, these steps may be performed indiscriminately on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

If the home gateway HGW 10 is formed with a reprogrammable computing machine, the corresponding program (that is to say the sequence of instructions) may be stored in a removable storage medium (such as for example a floppy disk, a CD-ROM or a DVD-ROM) or a non-removable storage medium) this storage medium being able to be read partly or fully by a computer or a processor.

The various embodiments have been described above with reference to a Livebox® home gateway, but may more generally be implemented in any gateway, router, DHCP server, and more generally in any network equipment located in the flow between the communicating object and the wide area communication network, etc.

The invention claimed is:

1. A method of managing a local area communication network comprising at least one access equipment for accessing the network, and at least one communicating object able to be connected to the network, the method comprising:
upon detecting connection of a new communicating object to the network and/or upon detecting installation of new firmware on the at least one communicating object connected to the network, a learning phase comprising observing interactions of the communicating object with at least one other equipment of the local area network and/or at least one equipment of a wide area communication network accessible via the access equipment;
creating at least one security rule associated with the communicating object on the basis of the observed interactions; and
modifying the created security rule if a user of the communicating object is present within the local area communication network.

2. The method of claim 1, wherein the at least one security rule associated with the communicating object comprises a list of at least one equipment of the local area communication network and/or of the wide area communication network that the communicating object is authorized to access.

3. The method of claim 1, wherein the at least one security rule associated with the communicating object comprises a maximum volume of data that the communicating object is authorized to exchange.

4. The method of claim 1, wherein the at least one security rule associated with the communicating object comprises a maximum number of access requests that the communicating object is authorized to transmit.

5. The method of claim 1, wherein the learning phase has a duration able to be parameterized by a manager of the local area communication network.

6. The method of claim 1, further comprising transmitting data relating to the interactions observed for the communicating object to at least one equipment of the wide area communication network.

7. The method of claim 1, wherein the creation of the at least one security rule also takes into account data relating to interactions observed for a communicating object of the same type as the communicating object, in at least one other local area communication network.

8. The method of claim 1, further comprising in the event of detecting an interaction of the communicating object with at least one other equipment of the local area network and/or at least one equipment of a wide area communication network accessible via the access equipment that contravenes the created security rule, blocking the interaction.

9. The method of claim 8, further comprising storing the blocked interaction in a log of suspicious interactions and/or alerting a user of the communicating object.

10. The method of claim 1, wherein detecting connection of a new communicating object to the network is done by detecting the presence of a new MAC address on the network.

11. A non-transitory computer readable product storing program code instructions that when executed by a processor implements the method of claim 1.

12. An access equipment for accessing a local area communication network comprising at least one communicating object able to be connected to said network, the access equipment comprising a hardware processor configured to:
   detect connection of a new communicating object to the network and/or install new firmware on the at least one communicating object connected to the network;
   observe interactions of the communicating object with at least one other equipment of the local area network and/or at least one equipment of a wide area communication network accessible via the access equipment;
   create at least one security rule associated with the communicating object on the basis of the observed interactions; and
   modify the created security rule if a user of the communicating object is present within the local area communication network.

13. The access equipment of claim 12, wherein the access equipment is configured to implement a method for managing a local area communication network as claimed in claim 1.

14. The access equipment of claim 12 integrated into a home gateway.

15. The access equipment of claim 12, wherein the at least one security rule associated with the communicating object comprises a list of at least one equipment of the local area communication network and/or of the wide area communication network that the communicating object is authorized to access.

16. The access equipment of claim 12, wherein the at least one security rule associated with the communicating object comprises a maximum volume of data that the communicating object is authorized to exchange.

17. The access equipment of claim 12, wherein the at least one security rule associated with the communicating object comprises a maximum number of access requests that the communicating object is authorized to transmit.

18. The access equipment of claim 12, wherein the hardware processor is further configured to transmit data relating to the interactions observed for the communicating object to at least one equipment of the wide area communication network.

* * * * *

UNITED STATES PATENT AND TRADEMARK OFFICE
CERTIFICATE OF CORRECTION

PATENT NO. : 11,632,399 B2
APPLICATION NO. : 16/978643
DATED : April 18, 2023
INVENTOR(S) : Eric Bouvet It is certified that error appears in the above-identified patent and that said Letters Patent is hereby corrected as shown below:

On the Title Page

Column 1 (Assignee), Line 1, delete "Orange" and insert -- Orange, Issy-les-Moulineaux (FR) --.

In the Specification

Column 1, Line 13 (Approx.), delete "1852012" and insert -- 1852612 --.

Column 1, Line 66, delete "network," and insert -- network --.

Column 2, Line 39, delete "trust," and insert -- trust --.

Column 3, Line 42, delete "to," and insert -- to --.

Column 4, Line 30 (Approx.), delete "local," and insert -- local --.

Column 4, Line 64, delete "Plug," and insert -- Plug --.

Column 5, Line 47, delete "compose" and insert -- comprise --.

Column 7, Line 2, delete "service," and insert -- service --.

Column 8, Line 67, after "for" insert -- the --.

Column 9, Line 2, after "object" insert -- 20 --.

Column 9, Line 38, delete "spec fic" and insert -- specific --.

Column 12, Line 22, delete "medium)" and insert -- medium, --.

Signed and Sealed this
First Day of August, 2023

Katherine Kelly Vidal
*Director of the United States Patent and Trademark Office*